United States Patent
Shimizu

(10) Patent No.: US 7,522,432 B2
(45) Date of Patent: Apr. 21, 2009

(54) SWITCHING REGULATOR AND CONTROL CIRCUIT AND METHOD USED THEREIN

(75) Inventor: Shinya Shimizu, Hyogo-ken (JP)

(73) Assignee: Ricoh Company, Ltd. (JP)

(*) Notice: Subject to any disclaimer, the term of this patent is extended or adjusted under 35 U.S.C. 154(b) by 21 days.

(21) Appl. No.: 11/902,889

(22) Filed: Sep. 26, 2007

(65) Prior Publication Data

US 2008/0079405 A1   Apr. 3, 2008

(30) Foreign Application Priority Data

Sep. 28, 2006   (JP) .............................. 2006-264333

(51) Int. Cl.
*H02H 7/125* (2006.01)
*G05F 1/40* (2006.01)

(52) U.S. Cl. .......................... 363/53; 363/77; 323/285; 323/301; 323/225; 323/259

(58) Field of Classification Search .................. 363/52, 363/53, 76, 77, 89, 90, 127; 323/225, 271, 323/284, 285, 290, 301, 259
See application file for complete search history.

(56) References Cited

U.S. PATENT DOCUMENTS 6,765,371 B2 * 7/2004 Kataoka ..................... 323/284

7,276,884 B2 * 10/2007 Tsuruya ....................... 363/16
7,391,190 B1 * 6/2008 Rajagopalan ............... 323/271

FOREIGN PATENT DOCUMENTS

JP   2004-248424   9/2004
JP   2005-229744   8/2005

* cited by examiner

*Primary Examiner*—Jessica Han
(74) *Attorney, Agent, or Firm*—Dickstein Shapiro LLP

(57) ABSTRACT

A switching regulator that performs voltage regulation using synchronous rectification in step-up and step-down modes includes input and output terminals, an inductor, first through fourth transistors, an overcurrent detection unit, and a control unit. The input terminal receives an input voltage. The inductor generates an output voltage. The output terminal provides the output voltage. The first and second transistors perform switching in the step-down mode. The third and fourth transistors perform switching in the step-up mode. The overcurrent detection unit detects an overcurrent condition. The control unit controls operation of the transistors, causes the first and third transistors to be off and the second and fourth transistors to be on when the overcurrent condition is detected in a first state, and causes the first and fourth transistors to be on and the second and third transistors to be off when the overcurrent condition is detected in a second state.

18 Claims, 4 Drawing Sheets

SWITCHING REGULATOR AND CONTROL CIRCUIT AND METHOD USED THEREIN

This application claims priority from Japanese Patent Application No. 2006-264333, filed on Sep. 28, 2006 in the Japanese Patent Office, the entire contents of which are incorporated by reference herein.

BACKGROUND OF THE INVENTION

1. Field of the Invention

The present invention relates to a switching regulator and a control circuit and method used therein, and more particularly, to a buck-boost switching regulator and a control circuit and method used therein, which perform voltage regulation using synchronous rectification and can provide effective overcurrent protection during the voltage regulation.

2. Discussion of the Background

Buck-boost switching regulators are used in power supplies of various electronic devices to obtain a desired voltage from a wide range of input voltage.

For example, compact portable electronic devices such as mobile phones, which have become popular in recent years, use buck-boost switching regulators to extend acceptable voltage range of a power supply used therewith. Such electronic devices commonly use secondary batteries, and attempts have been made to achieve longer operating times with smaller secondary batteries, for example, by enhancing battery performance and developing products with high energy efficiency. Using a buck-boost switching regulator in an electronic device with a secondary battery enables the device to normally operate with a wide range of input voltage supplied from the battery, thus enhancing energy efficiency. Further, the buck-boost switching regulator makes the electronic device compatible with various power supplies such as alternating current (AC) adaptors as well as batteries.

Buck-boost switching regulators are also used in power supplies with a high output voltage dynamic range, e.g., a power supply used in an amplifier for signal transmission. As these regulators can convert an input voltage to an output voltage that is either higher or lower than the input voltage, the use of a buck-boost switching regulator for such purpose significantly improves power efficiency.

For example, a buck-boost switching regulator used in a mobile phone amplifier serves to provide an appropriate supply voltage to the amplifier in accordance with the distance between the phone and a base station, that is, reducing the supply voltage when the distance is relatively short and increasing the supply voltage when the distance is relatively large.

In addition, switching regulators using inductors are widely used in battery-powered electronics for simplifying circuit design and achieving high energy efficiency.

Typically, an inductor-based buck-boost switching regulator includes an overcurrent protection circuit for preventing an overcurrent condition, which occurs when the output voltage rapidly rises, e.g., upon power-on, and can result in an excessively large current flowing to load circuit components connected thereto.

Referring to FIG. 1, a circuit diagram illustrating an example of a conventional buck-boost switching regulator 100 having an overcurrent protection circuit is described.

The buck-boost switching regulator 100 includes first through fourth transistors M101 through M104, an inductor L, first and second resistors R131 and R132, a current control circuit 131, a switching control circuit 132, an overcurrent detection circuit 133, first and second voltage sensors 134 and 135, and a driver 136.

The buck-boost switching regulator 100 receives a voltage input from a terminal IN, performs voltage regulation, and outputs a regulated voltage to a terminal OUT. The output voltage is higher than the input voltage in a boost (step-up) mode and lower than the input voltage in a buck (step-down) mode.

In the buck mode, the first transistor M101 turns on/off to control the output voltage while the second transistor M102 turns on/off to perform synchronous rectification. Similarly, in the boost mode, the third transistor M103 turns on/off to control the output voltage while the second transistor M104 turns on/off to perform synchronous rectification.

The first voltage sensor 134 detects voltage across the first resistor R131, and the second voltage sensor 135 detects voltage across the second resistor R132. The overcurrent detection circuit 133 receives signals from the voltage sensors 134 and 135, respectively, and outputs a signal indicating an overcurrent condition when a current level detected from the received signals is higher than a specified reference level. Upon overcurrent detection, the overcurrent detection circuit 133 outputs a signal to the switching control circuit 132, so that the switching control circuit 132 controls the driver 136 to turn off the first through fourth transistors M101 through M104.

A drawback of such overcurrent protection function is that it may result in a failure to raise the output voltage to a sufficient level in rapidly boosting the output voltage, e.g., upon power-on, which causes considerable inconvenience when the switching regulator is used in the mobile phone amplifier application, where output voltage level rapidly changes from low to high or vise versa at frequent intervals.

Therefore, a conventional buck-boost switching regulator is designed so that the overcurrent protection function does not work during power-on, or that the reference level for overcurrent detection is set to be unreasonably high. Neither alternative is desirable.

SUMMARY OF THE INVENTION

This patent specification describes a switching regulator that performs voltage regulation using synchronous rectification and can provide effective overcurrent protection during the voltage regulation.

In one embodiment, the novel switching regulator that performs voltage regulation using synchronous rectification to provide a given constant voltage in step-up and step-down modes includes an input terminal, an inductor, an output terminal, first through fourth transistors, an overcurrent detection unit, and a control unit. The input terminal is configured to receive an input voltage. The inductor is configured to generate an output voltage based on the input voltage. The output terminal is configured to provide the output voltage generated by the inductor. The first transistor is configured to perform switching to charge the inductor in the buck mode. The second transistor is configured to perform switching to discharge the inductor in the buck mode. The third transistor is configured to perform switching to charge the inductor in the boost mode. The fourth transistor is configured to perform switching to discharge the inductor in the boost mode. The overcurrent detection unit is configured to detect an overcurrent condition during the voltage regulation. The control unit is configured to control operation of the first through fourth transistors to regulate the output voltage to the constant voltage. The control unit is further configured to cause the first transistor to be off, the second transistor to be on, the third transistor to be off, and the fourth transistor to be on when the overcurrent detection unit detects the overcurrent condition in a first state, and cause the first transistor to be on, the second transistor to be off, the third transistor to be off, and the fourth transistor to be on when the overcurrent detection unit detects the overcurrent condition in a second state. The overcurrent condition indicates that a current at the output terminal exceeds a given current level. The first state indicates that the input voltage is below the output voltage. The second state indicates that the input voltage is above the output voltage.

This patent specification also describes a control circuit used in a switching regulator that performs voltage regulation using synchronous rectification and can provide effective overcurrent protection during the voltage regulation.

In one embodiment, the novel control circuit for use in a switching regulator that performs voltage regulation using synchronous rectification to provide a given constant voltage in step-up and step-down modes includes an overcurrent detection unit and a control unit. The overcurrent detection unit is configured to detect an overcurrent condition during the voltage regulation. The control unit is configured to control operation of first through fourth transistors for the voltage regulation. The control unit causes the first transistor to be off, the second transistor to be on, the third transistor to be off, and the fourth transistor to be on when the overcurrent detection unit detects the overcurrent condition in a first state, and causes the first transistor to be on, the second transistor to be off, the third transistor to be off, and the fourth transistor to be on when the overcurrent detection unit detects the overcurrent condition in a second state. The switching regulator receives an input voltage at an input terminal, generates an output voltage based on the input voltage using an inductor, and outputs the output voltage from the output terminal. The overcurrent condition indicates that a current at the output terminal exceeds a given current level. The first state indicates that the input voltage is below the output voltage. The second state indicates that the input voltage is above the output voltage.

This patent specification further describes a method for controlling a switching regulator that performs voltage regulation using synchronous rectification and can provide effective overcurrent protection during the voltage regulation.

In one embodiment, the novel method for controlling a switching regulator that performs voltage regulation using synchronous rectification to provide a given constant voltage in step-up and step-down modes includes the steps of receiving, generation, providing, switching, detection, first control, and second control. The receiving step receives an input voltage at an input terminal. The generation step generates an output voltage based on the input voltage using an inductor. The providing step provides the output voltage from an output terminal. The switching step controls a first transistor to perform switching to charge the inductor in the buck mode, a second transistor to perform switching to discharge the inductor in the buck mode, a third transistor to perform switching to charge the inductor in the boost mode, and a fourth transistor to perform switching to discharge the inductor in the boost mode. The detection step detects an overcurrent condition during the voltage regulation. The first control step causes the first transistor to be off, the second transistor to be on, the third transistor to be off, and the fourth transistor to be on when the overcurrent condition is detected in a first state. The second control causes the first transistor to be on, the second transistor to be off, the third transistor to be off, and the fourth transistor to be on when the overcurrent condition is detected in a second state. The overcurrent condition indicates that a current at the output terminal exceeds a given current level. The first state indicates that the input voltage is below the output voltage. The second state indicates that the input voltage is above the output voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
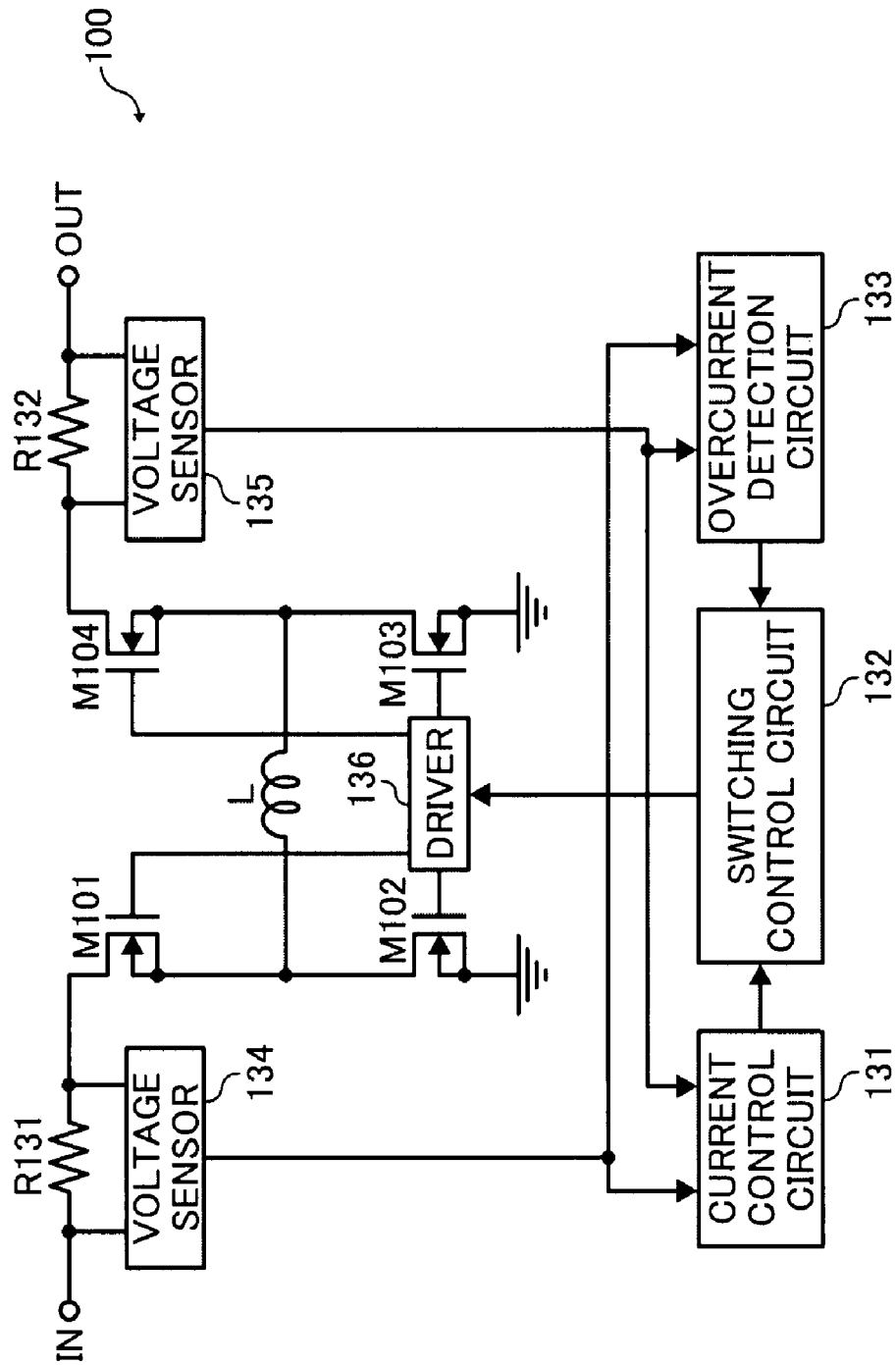
FIG. 1 is a circuit diagram illustrating an example of a conventional buck-boost switching regulator with an overcurrent protection circuit.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, example embodiments of the present patent application are described.

Figure 2:
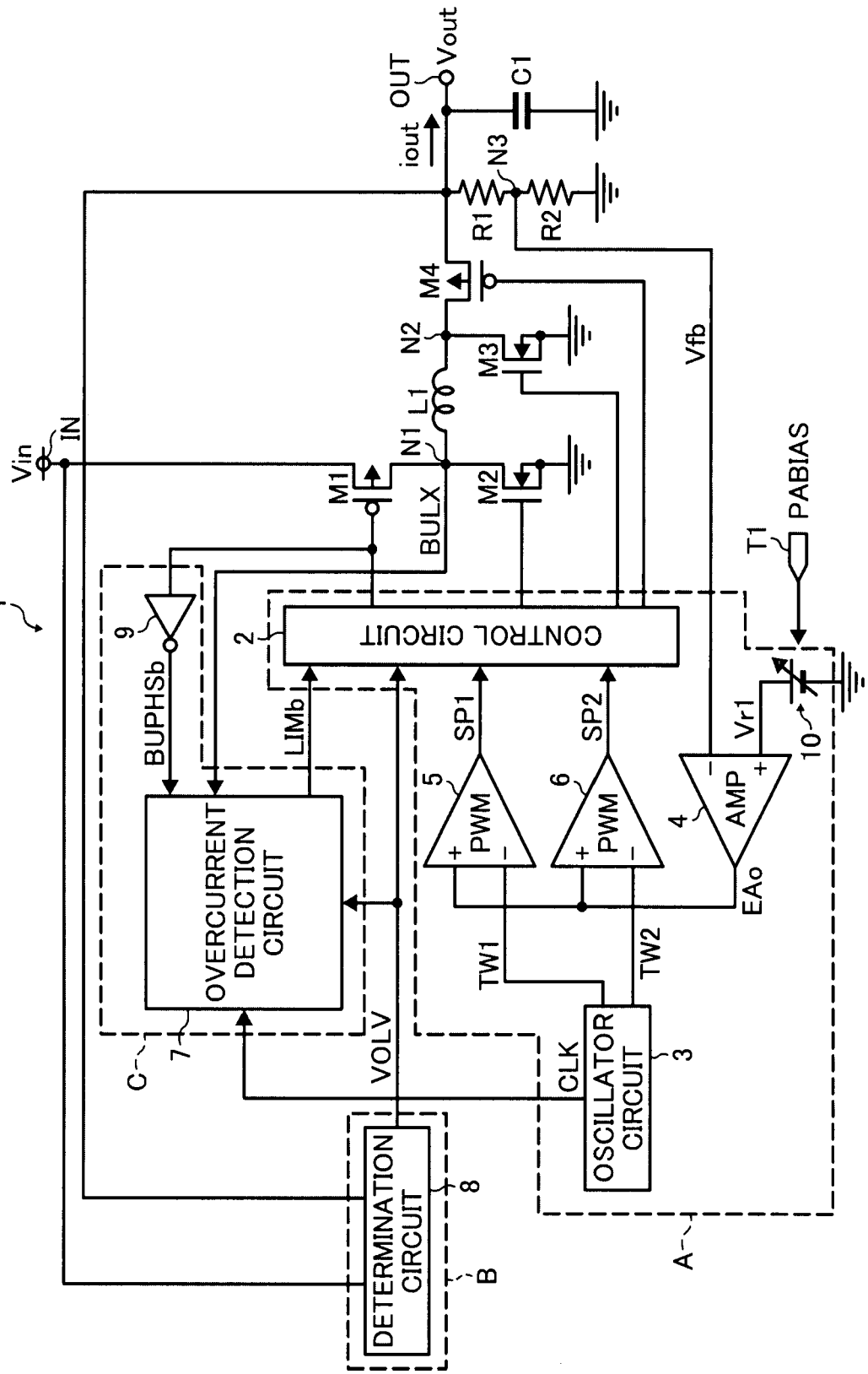
FIG. 2 is a circuit diagram illustrating a buck-boost switching regulator 1 according to at least one example embodiment of the present invention.

Referring to FIG. 2 of the drawings, a circuit diagram illustrating a buck-boost switching regulator 1 according to at least one example embodiment of the present invention is described.

In FIG. 2, the buck-boost switching regulator 1 includes a first switching transistor M1, a first synchronous rectifier transistor M2, a second switching transistor M3, a second synchronous rectifier transistor M4, an inductor L1, a capacitor C1, first and second resistors R1 and R2, an input terminal IN, an output terminal OUT, and a control terminal T1 connected to outside.

Further, the buck-boost switching regulator 1 includes a control unit A, a comparator unit B, and an overcurrent detection unit C.

The control unit A includes a control circuit 2, an oscillator circuit 3, an error amplifier 4, a first pulse width modulation (PWM) comparator 5, a second PWM comparator 6, and a bias voltage generator 10.

The comparator unit B includes a determination circuit 8.

The overcurrent detection unit C includes an overcurrent detection circuit 7 and an inverter 9.

As shown in FIG. 2, the first switching transistor M1 and the first synchronous rectifier transistor M2 are connected in series between the input terminal IN and ground, forming a node N1 therebetween. The inductor L1 and the second synchronous rectifier transistor M4 are connected in series between the node N1 and the output terminal OUT, forming a node N2 therebetween. The second switching transistor M3 is connected between the node N2 and ground. The capacitor C1 is connected between the output terminal OUT and ground. The resistors R1 and R2 are connected in series between the output terminal OUT and ground, forming a node N3 therebetween.

The input terminal is connected to a power supply, not shown, so that an input voltage Vin is supplied from the input terminal IN. The output terminal is connected to a load, not shown, so that an output voltage Vout is output to the load via the output terminal OUT.

The node N3 is connected to an inverting input of the error amplifier 4, and a feedback signal Vfb is transmitted from the node N3 to the inverting input of the error amplifier 4.

The terminal T1 is connected to the bias voltage generator 10, and a control signal PABIAS is transmitted from the terminal T1 to the bias voltage generator 10. The bias voltage generator 10 is connected to a non-inverting input of the error amplifier 4, and a reference signal Vr1 is transmitted from the bias voltage generator to the non-inverting input of the error amplifier 4.

The error amplifier 4 has an output connected to each of a non-inverting input of the PWM comparator 5 and a non-inverting input of the PWM comparator 6, and a signal EAo is transmitted from the output of the error amplifier 4 to each of the non-inverting input of the PWM comparator 5 and the non-inverting input of the PWM comparator 6.

The oscillator circuit 3 is connected to each of an inverting input of the PWM comparator 5, an inverting input of the PWM comparator 6, and the overcurrent detection circuit 7, and a first given triangle wave signal TW1 is transmitted from the oscillator circuit 3 to the inverting input of the PWM comparator 5, a second given triangle wave signal TW2 is transmitted from the oscillator circuit 3 to the inverting input of the PWM comparator 6, and a square wave signal CLK is transmitted from the oscillator circuit 3 to the overcurrent detection circuit 7.

The PWM comparator 5 has an output connected to the control circuit 2, and a first PWM pulse signal SP1 is transmitted from the output of the PWM comparator 5 to the control circuit 2. The PWM comparator 6 has an output connected to the control circuit 2, and a second PWM pulse signal SP2 is transmitted from the output of the PWM comparator 6 to the control circuit 2.

The control circuit 2 is connected to each of a gate of the first switching transistor M1, a gate of the first synchronous rectifier transistor M2, a gate of the second switching transistor M3, a gate of the second synchronous rectifier transistor M4, and an input of the inverter 9, and drive signals, not shown, are applied to the gates of the transistors M1 through M4.

The determination circuit 8 is connected to each of the overcurrent detection circuit 7 and the control circuit 2, and a signal VOLV is transmitted from the determination circuit 8 to each of the overcurrent detection circuit 7 and the control circuit 2. The determination circuit 8 is further connected to the input terminal IN and the output terminal OUT, and the input voltage Vin and the output voltage Vout are input to the determination circuit 8.

The inverter 9 has an output connected to the overcurrent detection circuit 7, and a signal BUPHSb is transmitted from the inverter 9 to the overcurrent detection circuit 7.

The inductor L1 has one end connected to the node N1 which is further connected to the overcurrent detection circuit 7, and a signal BULX is transmitted from the end of the inductor L1 to the overcurrent detection circuit 7.

The overcurrent detection circuit 7 is connected to the control circuit 2, and a signal LIMb is transmitted from the overcurrent detection circuit 7 to the control circuit 2.

In the buck-boost switching regulator 1 of FIG. 2, the first switching transistor M1 and the second synchronous rectifier transistor M4 are P-channel metal-oxide-semiconductor (PMOS) transistors. The first synchronous rectifier transistor M2 and the second switching transistor M3 are N-channel metal-oxide-semiconductor (NMOS) transistors.

The circuit components of the buck-boost switching regulator 1 described above except for the inductor L1 and the capacitor C1 may be constructed on a single integrated circuit (IC). Alternatively, the components except for the inductor L1, the capacitor C1, and at least one of the transistors M1 through M4 may be constructed on a single IC. Further, the components may be integrated on a single IC with other circuitry, including a circuit connected to the control terminal T1.

In operation, the buck-boost switching regulator 1 performs voltage regulation using different modes of operation to generate the output voltage Vout from the input voltage Vin. In a boost mode (step-up mode), the output voltage Vout is regulated to a given reference value higher than the input voltage Vin. In a buck mode (step-down mode), the output voltage Vout is regulated to a given reference value lower than the input voltage Vin. The reference value can be varied and is externally specified by the PABIAS signal.

The control unit A serves to control switching of the transistors M1 through M4 to step up (boost) and step down (buck) the input voltage Vin based on the PABIAS signal and the Vfb signal indicating a feedback voltage.

In the control unit A, the bias voltage generator 10 receives the PABIAS signal, generates the Vr1 signal indicating a variable reference voltage proportional to the PABIAS signal, and outputs the Vr1 signal to the error amplifier 4.

The error amplifier 4 receives the Vfb signal and the Vr1 signal, and outputs the EAo signal to each of the first and second PWM comparators 5 and 6.

The oscillator circuit 3 generates the TW1 signal for boost voltage regulation, the TW2 signal for buck voltage regulation, and the CLK signal for overcurrent detection, respectively, to output the TW1 signal to the first PWM comparator 5, the TW2 signal to the second PWM comparator 6, and the CLK signal to the overcurrent detection unit C. The triangle wave signals TW1 and TW2 and the square wave signal CLK are synchronized and have a given common frequency. The signals TW1 and TW2 have a substantially equal amplitude while the TW1 signal has a higher voltage level than that of the TW2 signal.

The first PWM comparator 5 receives the EAo signal and the TW1 signal, generates therefrom the SP1 signal for boost voltage regulation, and transmits the SP1 signal to the control circuit 2. The second PWM comparator 6 receives the EAo signal and the TW1 signal, generates therefrom the SP2 signal for buck voltage regulation, and transmits the SP2 signal to the control circuit 2.

The control circuit 2 receives the signals SP1 and SP2, and based on the received signals, controls switching of the transistors M1 through M4, automatically changing between the buck and boost modes.

In the buck mode, the control circuit 2 generates the drive signals based on the SP2 signal, which drive the first switching transistor M1 and the first synchronous rectifier transistor M2 to operate in a complementary manner so as to charge and discharge the inductor L1. The first switching transistor M1 serves to regulate the voltage while the first synchronous rectifier M2 serves to perform synchronous rectification.

In the boost mode, the control circuit 2 generates the drive signals based on the SP1 signal, which drive the second switching transistor M3 and the second synchronous rectifier transistor M4 to operate in a complementary manner so as to charge and discharge the inductor L1. The second switching transistor M3 serves to regulate the voltage while the second synchronous rectifier M4 serves to perform synchronous rectification.

Energy thus stored in the inductor L1 is supplied to the load via the output terminal OUT at the regulated output voltage Vout.

During the voltage regulation, the buck-boost switching regulator 1 performs overcurrent protection when determining that there occurs a condition where output current iout becomes greater than a given value (hereinafter referred to as "overcurrent condition").

In the overcurrent protection, the control unit A communicates with the comparator unit B and the overcurrent detection unit C to control operation of the transistors M1 through M4. The comparator unit B serves to compare the input voltage Vin and the output voltage Vout while the overcurrent detection unit C serves to detect an overcurrent condition. When an overcurrent condition occurs, the buck-boost switching regulator 1 provides proper overcurrent protection that varies depending on whether Vin>Vout or Vin<Vout.

In the comparator unit B, the determination circuit 8 makes a comparison between the input voltage Vin and the output voltage Vout to output the VOLV signal indicating the result of the comparison. For example, the VOLV signal is in high state when the input voltage Vin is determined to be greater than the output voltage Vout, and otherwise is in low state. The VOLV signal is transmitted to each of the control unit A and the overcurrent detection unit C.

In the overcurrent detection unit C, the inverter 9 receives the drive signal applied to the gate of the first switching transistor M1, and inverts the received signal to output the BUPHSb signal indicating the switching state of the transistor M1. The overcurrent detection circuit 7 receives the BUPHSb signal, the VOLV signal, the CLK signal, and the BULX signal indicating voltage at the node N1, and based on the received signals, determines whether an overcurrent condition occurs to output the LIMb signal indicating whether an overcurrent condition is detected. For example, the LIMb signal goes from high to low when an overcurrent condition is detected. The LIMb signal is transmitted to the control unit A.

In the control unit A, the control circuit 2 receives the LIMb signal and the VOLV signal. When the LIMb signal indicates the detection of an overcurrent condition, the control circuit 2 controls switching of the transistors M1 through M4 in different manners depending on whether Vin>Vout or Vin<Vout is indicated by the VOLV signal.

When the VOLV signal indicates that Vin>Vout, the control circuit 2 causes the first switching transistor M1 to be off, the second switching transistor M2 to be on, the third switching transistor M3 to be off, and the fourth switching transistor M4 to be on. As a result, the electric current from the input terminal IN does not flow in the inductor L1 as the transistors M1 and M3 are both cut off and do not conduct. Further, the energy stored in the inductor L1 is swiftly discharged as the transistors M2 and M4 are both conductive to allow current flow, thus preventing a rapid reduction of the output voltage Vout.

When the VOLV signal indicates that Vin<Vout, the control circuit 2 causes the first switching transistor M1 to be on, the second switching transistor M2 to be off, the third switching transistor M3 to be off, and the fourth switching transistor M4 to be on. As a result, the energy stored in the inductor L1 is swiftly discharged, thus preventing a rapid reduction of the output voltage Vout.

Such overcurrent protection can prevent an excessive current caused by a short circuit that occurs during boost mode operation, e.g., the output voltage Vout falling below the input voltage Vin due to a connection between the output terminal OUT and ground. When a short circuit occurs during boost mode operation, the VOLV signal is inverted from one state to another. In such case, as the VOLV signal indicates that Vin<Vout, the control circuit 2 causes the first switching transistor M1 to be off, the second switching transistor M2 to be on, the third switching transistor M3 to be off, and the fourth switching transistor M4 to be on, thus preventing a large current flow caused by the short circuit.

In a further embodiment, it may be possible, with an appropriate circuit configuration, to derive the BULX signal from the voltage drop across the second synchronous rectifier transistor M4 instead of the voltage drop across the first switching transistor M1.

In a still further embodiment, a resistor-based overcurrent detection unit including voltage sensors with resistors may replace the overcurrent detection unit C to perform overcurrent detection. However, such a resistor-based detection unit is less advantageous to the detection unit C in terms of energy efficiency as the resistors for the overcurrent detection require additional power consumption.

Figure 3:
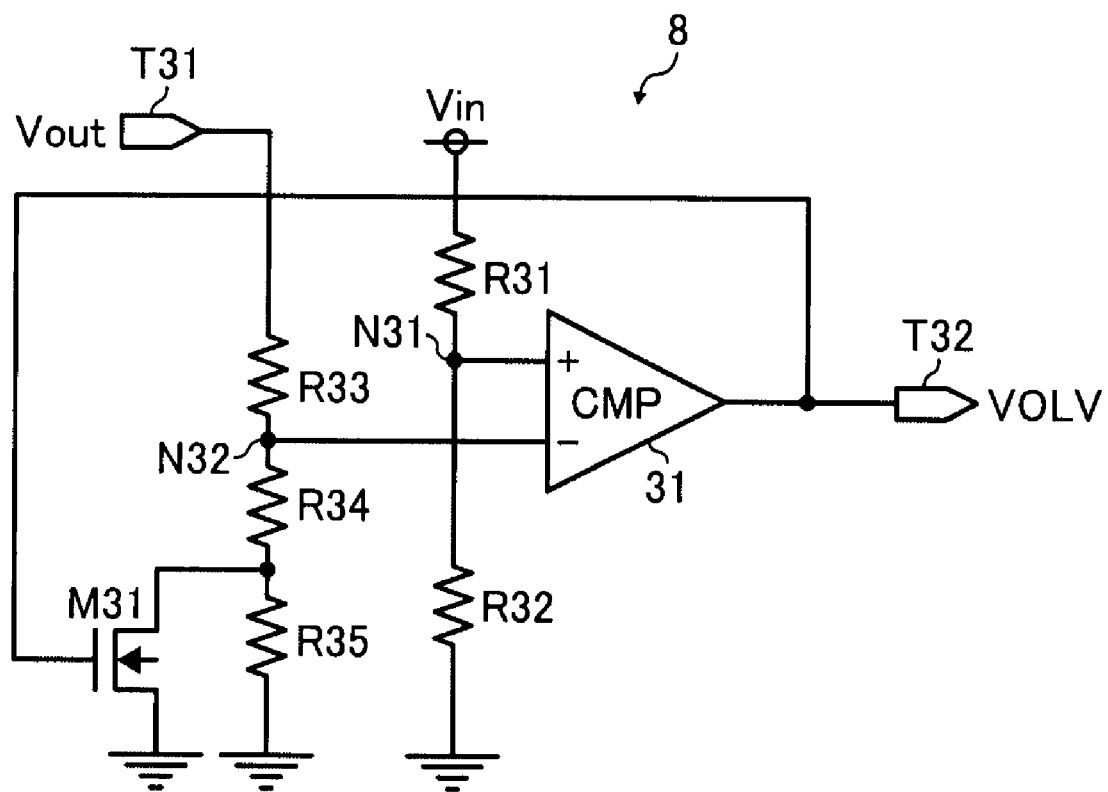
FIG. 3 is a circuit diagram illustrating an example of a determination circuit for use in the buck-boost switching regulator of FIG. 2.

Referring now to FIG. 3, a circuit diagram illustrating an example of the determination circuit 8 for use in the buck-boost switching regulator 1 of FIG. 2 is described.

In FIG. 3, the determination circuit 8 includes a comparator 31, an NMOS transistor M31, and resistors R31 through R35.

The determination circuit 8 further includes an input terminal T31 and an output terminal T32. The terminal T31 receives the output voltage Vout. The terminal T32 outputs the VOLV signal. The determination circuit 8 is connected to the input terminal IN, so that the input voltage Vin is transmitted thereto.

The resistors R31 and R32 are connected in series between the input voltage Vin and ground, forming a node N31 therebetween. The resistors R33 through R35 are connected in series between the output voltage Vout and ground, forming a node N32 between the resistors R33 and R34. The NMOS transistor M31 is connected in parallel with the resistor R35. The comparator 31 has a non-inverting input connected to the node N31, an inverting input connected to the node N32, and an output connected to each of the terminal T32 and a gate of the NMOS transistor M31.

In operation, the comparator 31 receives a voltage of the node N31 at the non-inverting input and a voltage of the node N32 at the inverting input. The comparator 31 makes a comparison therebetween to output the VOLV signal indicating whether Vin>Vout or Vin<Vout. In the determination circuit 8 of FIG. 3, the VOLV signal is in high state when Vin>Vout, and is in low state when Vin<Vout.

Additionally, when the VOLV signal goes high, the NMOS transistor M31 turns on to cause current flow therethrough. This results in a lower voltage applied to the inverting input of the comparator 31, adding hysteresis to the comparator 31.

Figure 4:
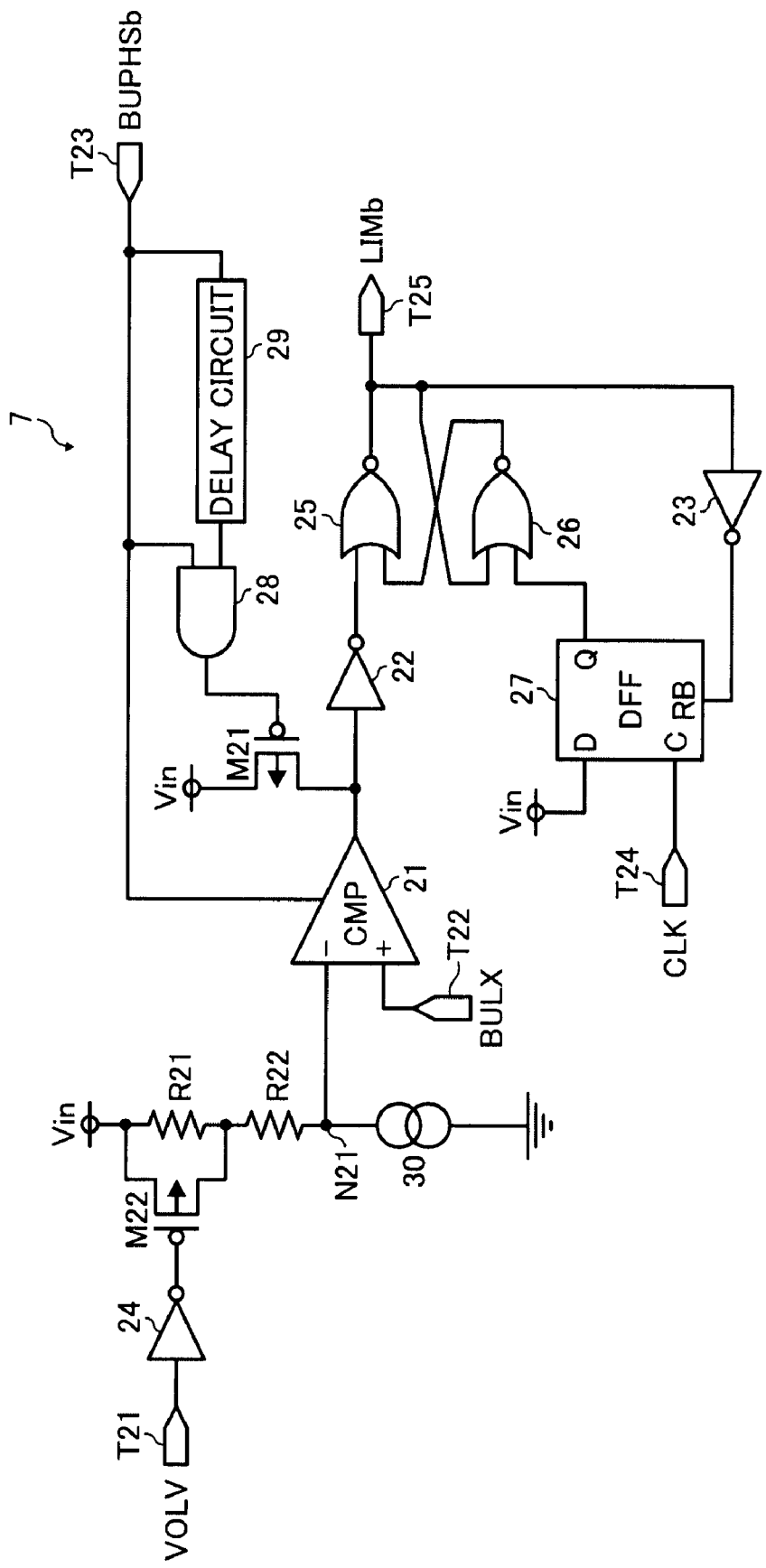
FIG. 4 is a circuit diagram illustrating an example of the overcurrent detection circuit for use in the buck-boost switching regulator of FIG. 2.

Referring now to FIG. 4, a circuit diagram illustrating an example of the overcurrent detection circuit 7 for use in the buck-boost switching regulator 1 of FIG. 2 is described.

In FIG. 4, the overcurrent detection circuit 7 includes a comparator 21, inverters 22 through 24, NOR gates 25 and 26, a D flip-flop 27, an AND gate 28, a delay circuit 29, a constant current source 30, PMOS transistors M21 and M22, and resistors R21 and R22.

The overcurrent detection circuit 7 further includes input terminals T21 through T24 and an output terminal T25. The input terminal T21 receives the VOLV signal. The input terminal T22 receives the BULX signal. The input terminal T23 receives the BUPHSb signal. The input terminal T23 receives the CLK signal. The output terminal T25 outputs the LIMb signal.

In the overcurrent detection circuit 7, the resistors R21 and R22 and the current source 30 are connected in series between an input voltage Vin and ground, forming a node N21 between the resistor R22 and the current source 30. The PMOS transistor M22 is connected in parallel with the resistor R21, and has a gate connected to the terminal T21 through the inverter 24.

The comparator 21 has an inverting input connected to the node N21, a non-inverting input connected to the terminal T22, a control terminal connected to the terminal T23, and an output connected to the NOR gate 25 through the inverter 22. The PMOS transistor M21 is connected between an input voltage Vin and the output of the comparator 21. The AND gate 28 has a first input directly connected to the terminal T23, a second input connected to the terminal T23 through the delay circuit 29, and an output connected to a gate of the PMOS transistor M21.

The D flip-flop 27 has a D input connected to an input voltage Vin, a C input connected to the terminal T24, an RB input connected to the inverter 23, and a Q output connected to the NOR gate 26.

The NOR gate 25 has a first input connected to the output of the comparator 21 through the inverter 22, a second input connected to the NOR gate 26, and an output connected to each of the terminal T25 and the NOR gate 26. The NOR gate 26 has a first input connected to the output of the NOR gate 26, a second input connected to the Q output of the D flip-flop 27, and an output connected to the second input of the NOR gate 25. The NOR gates 25 and 26 form an RS flip-flop with a reset input being the first input of the NOR gate 25 and a set input being the second input of the NOR gate 26.

Additionally, the overcurrent detection circuit 7 of FIG. 4 assumes that the VOLV signal is high when Vin>Vout, and is low when Vin<Vout. Since in a steady state, Vin>Vout for the buck mode and Vin<Vout for the boost mode as long as there is no voltage loss due to circuit components such as switching transistors, the high state of the VOLV signal indicates buck mode operation and the low state of the VOLV signal indicates boost mode operation.

Further, it is also assumed that an input current supplied to obtain a specific output current varies depending on the operation mode in the buck-boost switching regulator 1, i.e., a larger amount of current is provided in the boost mode than in the buck mode to obtain a same output.

In operation, the comparator 21 receives the BULX signal at the non-inverting input and a reference voltage at the inverting input, and makes a comparison therebetween. When the BULX signal becomes lower than the reference voltage, it is determined that the input current corresponding to the BULX signal becomes greater than a reference current corresponding to the reference voltage, which indicates that the output current iout becomes greater than a given level, i.e., an overcurrent condition occurs.

As shown in FIG. 4, the reference voltage used for such overcurrent detection is voltage at the node N21, which varies depending on whether the PMOS transistor M22 is on or off. The PMOS transistor M22 turns on/off when the VOLV signal applied thereto through the inverter 24 transitions, indicating a change in the operation mode of the buck-boost switching regulator 1.

When the VOLV signal goes high, indicating buck mode operation, the PMOS transistor M22 turns on to conduct current therethrough, resulting in a relatively high reference voltage Vr21. When the VOLV signal goes low, indicating boost mode operation, the PMOS transistor M22 turns off to prevent current therethrough, resulting in a relatively low reference voltage Vr22.

Consequently, the relatively high reference voltage Vr21 is used for overcurrent detection during buck mode operation and the relatively low reference voltage Vr22 is used for overcurrent detection during boost mode operation, that is, the reference current is set relatively low for buck mode operation and relatively high for boost mode operation. The reference voltages Vr21 and Vr22 are arranged so that an overcurrent condition is detected at a substantially same level of the output current iout regardless of the operation mode.

The comparator 21 outputs a low level signal when the BULX signal is lower than the reference voltage, and otherwise outputs a high level signal. The output of the comparator 21, which is input to the inverter 22, is high as long as there occurs no overcurrent condition.

The PMOS transistor M21 switches on/off to control the input to the inverter 22. The switching of the PMOS transistor M21 is controlled based on the BUPHSb signal indicating the state of the first switching transistor M1 of the buck-boost switching regulator 1, which is input to the AND gate directly and through the delay circuit.

When the transistor M1 is off and the BUPHSb signal is low, the AND gate 28 outputs a low signal to turn on the PMOS transistor M21. When the transistor M1 is on and the BUPHSb signal is high, the AND gate 28 outputs a high signal to turn off the PMOS transistor M21.

When the PMOS transistor M21 is on, the input to the inverter 22 is set to high so that the input to the NOR gate 25 is low regardless of the output of the comparator 21. When the PMOS transistor M21 is off, the output of the comparator 21 indicating the result of the overcurrent detection is input to the inverter 22, thereby inverted, and applied to the NOR gate 25. As a result, a low signal indicating the detection of an overcurrent condition is transmitted to the inverter 22 only when the first switching transistor M1 is on.

In addition, the BUPHSb signal is also input to the comparator 21. The comparator 21 is inactive when the BUPHSb signal is low, and becomes active when the BUPHSb signal goes high. The delay circuit 29 serves to delay switching of the PMOS transistor M21, so that the PMOS transistor M21 remains open until the operation of the comparator 21 is stabilized after activation.

The output of the comparator 21 is thus applied to the NOR gate 25 through the inverter 22. The NOR gate 25 outputs the LIMb signal to each of the terminal 25, the NOR gate 26, and the inverter 23. The LIMb signal goes low when an overcurrent condition is detected during ON time of the first switching transistor M1.

In the D flip-flop 27, the C input receives the CLK signal from the terminal T24, the D input receives an input voltage Vin, and the reset input RB receives an inverted version of the LIMb signal from the inverter 23.

When the overcurrent condition is removed, the LIMb signal remains low until a high signal is applied to the NOR gate 26 from the Q output of the D flip-flop 27. While the LIMb signal is low, the Q output becomes high in response to the CLK signal going high, causing the LIMb signal to again go high. Then, the Q output becomes low in response to the LIMb signal going high. As a result, the LIMb signal goes high to indicate the removal of an overcurrent condition in synchronization with the CLK signal having a specific frequency.

This invention may be conveniently implemented using a conventional general-purpose digital computer programmed according to the teachings of the present specification, as will be apparent to those skilled in the computer arts. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this patent specification may be practiced otherwise than as specifically described herein.

What is claimed is:

1. A switching regulator that performs voltage regulation using synchronous rectification to provide a given constant voltage in step-up and step-down modes, the switching regulator comprising:
   an input terminal configured to receive an input voltage;
   an inductor configured to generate an output voltage based on the input voltage;
   an output terminal configured to provide the output voltage generated by the inductor;
   a first transistor configured to perform switching to charge the inductor in the step-down mode;
   a second transistor configured to perform switching to discharge the inductor in the step-down mode;
   a third transistor configured to perform switching to charge the inductor in the step-up mode;
   a fourth transistor configured to perform switching to discharge the inductor in the step-up mode;
   an overcurrent detection unit configured to detect an overcurrent condition during the voltage regulation; and
   a control unit configured to control operation of the first through fourth transistors to regulate the output voltage to the given constant voltage, and to cause the first transistor to be off, the second transistor to be on, the third transistor to be off, and the fourth transistor to be on when the overcurrent detection unit detects the overcurrent condition in a first state, and cause the first transistor to be on, the second transistor to be off, the third transistor to be off, and the fourth transistor to be on when the overcurrent detection unit detects the overcurrent condition in a second state,
   the overcurrent condition indicating that a current at the output terminal exceeds a given current level,
   the first state indicating that the input voltage is below the output voltage,
   the second state indicating that the input voltage is above the output voltage.

2. The switching regulator according to claim 1, wherein the overcurrent detection unit detects the overcurrent condition when a current at the input terminal exceeds a given reference value.

3. The switching regulator according to claim 2, wherein the overcurrent detection unit determines a voltage drop at one end of the inductor connected to the input terminal to detect the overcurrent condition based on the determined voltage drop.

4. The switching regulator according to claim 2, wherein the overcurrent detection unit indicates removal of the overcurrent condition in synchronization with a pulse signal having a given frequency when the overcurrent condition is removed.

5. The switching regulator according to claim 2, wherein the reference value is greater for the step-up mode than for the step-down mode.

6. The switching regulator according to claim 1, wherein the constant voltage is based on a signal input from outside.

7. A control circuit for use in a switching regulator that performs voltage regulation using synchronous rectification to provide a given constant voltage in step-up and step-down modes, the control circuit comprising:
   an overcurrent detection unit configured to detect an overcurrent condition during the voltage regulation; and
   a control unit configured to control operation of first through fourth transistors for the voltage regulation,
   wherein the control unit causes the first transistor to be off, the second transistor to be on, the third transistor to be off, and the fourth transistor to be on when the overcurrent detection unit detects the overcurrent condition in a first state, and causes the first transistor to be on, the second transistor to be off, the third transistor to be off, and the fourth transistor to be on when the overcurrent detection unit detects the overcurrent condition in a second state,
   the switching regulator receiving an input voltage at an input terminal, generating an output voltage based on the input voltage using an inductor, and outputting the output voltage from the output terminal,
   the overcurrent condition indicating that a current at the output terminal exceeds a given current level,
   the first state indicating that the input voltage is below the output voltage,
   the second state indicating that the input voltage is above the output voltage.

8. The control circuit according to claim 7, wherein the overcurrent detection unit detects the overcurrent condition when a current at the input terminal exceeds a given reference value.

9. The control circuit according to claim 8, wherein the overcurrent detection unit determines a voltage drop at one end of the inductor connected to the input terminal to detect the overcurrent condition based on the determined voltage drop.

10. The control circuit according to claim 8, wherein the overcurrent detection unit indicates removal of the overcurrent condition in synchronization with a pulse signal having a given frequency when the overcurrent condition is removed.

11. The control circuit according to claim 8, wherein the reference value is greater for the step-up mode than for the step-down mode.

12. The control circuit according to claim 7, wherein the constant voltage is based on a signal input from outside.

13. A method for controlling a switching regulator that performs voltage regulation using synchronous rectification to provide a given constant voltage in step-up and step-down modes, the method comprising:
   receiving an input voltage at an input terminal;
   generating an output voltage based on the input voltage using an inductor;
   providing the output voltage from an output terminal;
   controlling a first transistor to perform switching to charge the inductor in the step-down mode, a second transistor to perform switching to discharge the inductor in the step-down mode, a third transistor to perform switching to charge the inductor in the step-up mode, and a fourth transistor to perform switching to discharge the inductor in the step-up mode;

detecting an overcurrent condition during the voltage regulation;

causing the first transistor to be off, the second transistor to be on, the third transistor to be off, and the fourth transistor to be on when the overcurrent condition is detected in a first state; and causing the first transistor to be on, the second transistor to be off, the third transistor to be off, and the fourth transistor to be on when the overcurrent condition is detected in a second state, the overcurrent condition indicating that a current at the output terminal exceeds a given current level, the first state indicating that the input voltage is below the output voltage, the second state indicating that the input voltage is above the output voltage.

14. The method according to claim 13, wherein the overcurrent condition is detected when a current at the input terminal exceeds a given reference value.

15. The method according to claim 14, wherein the overcurrent detection unit detects a voltage drop at one end of the inductor connected to the input terminal to detect the overcurrent condition based on the detected voltage drop.

16. The method according to claim 14, wherein the overcurrent detection unit indicates removal of the overcurrent condition in synchronization with a pulse signal having a given frequency when the overcurrent condition is removed.

17. The method according to claim 14, wherein the reference value is greater for the step-up mode than for the step-down mode.

18. The method according to claim 13, wherein the constant voltage varies based on a signal input from outside.

* * * * *